US006952753B2

(12) United States Patent
Ralphs

(10) Patent No.: US 6,952,753 B2
(45) Date of Patent: Oct. 4, 2005

(54) DEVICE DRIVER WITH IMPROVED TIMEOUT PERFORMANCE

(75) Inventor: Randall Ralphs, Pinecliffe, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 206 days.

(21) Appl. No.: 10/160,916

(22) Filed: Jun. 3, 2002

(65) Prior Publication Data

US 2003/0225988 A1 Dec. 4, 2003

(51) Int. Cl.$^7$ .......................... G06F 12/00; G06F 11/00
(52) U.S. Cl. .......................... 711/111; 713/502; 714/55
(58) Field of Search ............................ 710/32, 45, 124; 711/111–112, 154, 167; 713/500, 502; 714/51, 55, 42

(56) References Cited

U.S. PATENT DOCUMENTS

| | | | | |
|---|---|---|---|---|
| 5,758,057 A | * | 5/1998 | Baba et al. ..................... | 714/7 |
| 5,894,583 A | * | 4/1999 | Johnson et al. ............... | 710/48 |
| 6,002,737 A | * | 12/1999 | Devanagundy et al. ....... | 377/20 |
| 6,782,496 B2 | * | 8/2004 | Fleming ....................... | 714/55 |
| 2002/0105914 A1 | * | 8/2002 | Duron ......................... | 370/252 |

OTHER PUBLICATIONS

Digital Equipment Corporation, "TruCluster Production Server Software Version 1.5 and TruCluster Available Server Software Version 1.5," Chapters 1,4,6 and 9, Jan. 1998.*

Wu, Stanley, "Can We Change the SCSI Command Timeout?," The Mail Archive, http://www.mail-archive.com/linux-scsi@vger.rutgers.edu/msg03215.html, Jun. 13, 2000.*

Sony, Installation Manual SDT–5000 Series, Version 1.30, Aug. 15, 1994.*

IBM, "Multiple Command Time–Outs for Multi–Tasking Computer Systems," IBM Technical Disclosure Bulletin, vol. 38, No. 5, May 1995.*

Digital Equipment Corporation, "TruCluster Production Server Software Version 1.5 and TruCluster Available Server Software Version 1.5," Jan. 1998.*

Digital Equipment Corporation, "TruCluster Software Manual," Chapter 9, 1998, 14 pages.

* cited by examiner

Primary Examiner—Matthew Kim
Assistant Examiner—Shane Thomas
(74) Attorney, Agent, or Firm—Robert C. Kowert; Meyertons, Hood, Kivlin, Kowert & Goetzel, P.C.

(57) ABSTRACT

A computer system may include a host computer system and a storage device such as a tape device that includes one or more tape drives. The host computer system may be configured to provide commands to the storage device and to initiate a timeout period for each command provided to the storage device. The host computer system may be configured to initiate a first timeout period if a first type of command is provided to the storage device, to initiate a second timeout period if a second type of command is provided to the storage device, and to initiate a third timeout period if a third type of command is provided to the storage device, where the first timeout period, the second timeout period, and the third timeout period each have a different duration.

39 Claims, 6 Drawing Sheets

| | | | 300 |
|---|---|---|---|
| Category 1:<br>Inquiry Commands | Default Timeout 1 | Default Multiplier 1 |
| Category 2:<br>I/O Commands | Default Timeout 2 | Default Multiplier 2 |
| Category 3:<br>Rewind Commands | Default Timeout 3 | Default Multiplier 3 |
| Category 4:<br>Space Commands | Default Timeout 4 | Default Multiplier 4 |
| Category 5:<br>Load Commands | Default Timeout 5 | Default Multiplier 5 |
| Category 6:<br>Unload Commands | Default Timeout 6 | Default Multiplier 6 |
| Category 7:<br>Erase Commands | Default Timeout 7 | Default Multiplier 7 |

| | Part Number | Timeout |
|---|---|---|
| VID 1 | Part Number 1 | Timeout(s) |
| | Part Number 2 | Timeout(s) |
| VID 2 | Part Number 1 | Timeout(s) |
| | Part Number 2 | Timeout(s) |
| | Part Number 3 | Timeout(s) |

*FIG. 5*

DEVICE DRIVER WITH IMPROVED TIMEOUT PERFORMANCE

BACKGROUND OF THE INVENTION

1. Field of the Invention

This invention relates to storage systems and, more particularly, to device drivers for storage devices.

2. Description of the Related Art

Tape drives may be an economical backup device due to both the relatively low cost of tape drives and tape media and the relatively large media size available for use in tape drives. Tape may be a sequential storage medium typically made of a flexible plastic with a ferromagnetic coating. Tapes may come in reels or cartridges of varying sizes and shapes.

Tapes may have one or more tracks. These tracks may run parallel to the length of the tape (linear recording) or diagonally between the edges of the tape (helical scan). Modern cartridges often include 128 or more tracks. One or more tracks may be dedicated to storing parity for other tracks. Data is typically written in blocks of contiguous bytes to each track. Blocks are separated by spaces called inter-record or inter-block gaps. Locating a particular record involves sequentially reading records until the desired record is reached or searching for the inter-record gap in front of the desired record.

Due to the sequential nature of tape, many tape operations take a significant amount of time to perform. While tape speed, which may be measured in inches per second, continues to improve, tape length, measured in inches, also continues to increase. As a result, newer drives tend to perform some operations (e.g., I/O (Input/Output) operations) more quickly than their predecessors do and other operations (e.g., erase and space operations) more slowly than their predecessors do.

Some tape drivers specify either one or two timeout values to specify the amount of time the device driver should wait for a response from a tape drive. For example, one timeout may be used for I/O operations and may have a value equal to several minutes. Another timeout may be used for all other operations and may have a value around one hour. In order to accommodate the increasing amounts of time newer devices take to perform certain operations, tape drivers may include a multiplier flag or attribute. If the multiplier flag or attribute is set, one or both of the default timeout values are multiplied by a default multiplier. Accordingly, setting the flag or attribute causes the timeouts for all of the operations in a particular category to be lengthened. This may cause timeouts to be undesirably long for many tape drive operations. Accordingly, it is desirable to improve tape device timeout driver performance.

SUMMARY

Various embodiments of a method and system for operating a storage device such as tape device may be implemented by providing device-specific and/or command-specific timeout values. In one embodiment, a computer readable medium may include program instructions computer executable to: provide a command initiated by an application program to a tape device; read a timeout value from a file, where the timeout value is a first timeout value if the command is a first type of command, a second timeout value if the command is a second type of command, and a third timeout value if the command is a third type of command, and where the first, second, and third timeout values are not equal; initiate a timeout period corresponding to the timeout value in response to providing the command to the tape device; and return an error indication to the application program if the tape device has not responded to the command by the end of the timeout period. Different categories of commands for which command specific timeout values may be defined include rewind commands, I/O commands, erase commands, load commands, unload commands, inquiry commands, and space commands.

Device specific timeout values may also be defined in some embodiments. For example, in one embodiment, a computer readable medium may include program instructions computer executable to: provide a command to a tape device; read data indicative of a timeout duration from a file, where the timeout duration is a first duration if the tape device is a first type of tape device and a second duration if the tape device is a second type of tape device; initiate a timeout period corresponding to the timeout duration; and generate an error indication if the tape device has not responded to the command by the end of the timeout period. Command specific timeout values may be defined for different types of tape devices in some embodiments.

A computer system may include a tape device that includes one or more tape drives and a host computer system coupled to the tape device. The host computer system may be configured to provide commands to the tape device and to initiate a timeout period for each command provided to the tape device. The host computer system may be configured to initiate a first timeout period if a first type of command is provided to the tape device, to initiate a second timeout period if a second type of command is provided to the tape device, and to initiate a third timeout period if a third type of command is provided to the tape device, where the first timeout period, the second timeout period, and the third timeout period each have a different duration.

BRIEF DESCRIPTION OF THE DRAWINGS

A better understanding of the present invention can be obtained when the following detailed description is considered in conjunction with the following drawings, in which:

FIG. 3 is a table showing the categories of operations and the associated timeouts and multipliers that may be defined for each category in one embodiment.

FIG. 5 is a table showing how device-specific timeouts may be defined for various types of tape devices that may be used in one embodiment.

Figure 1:
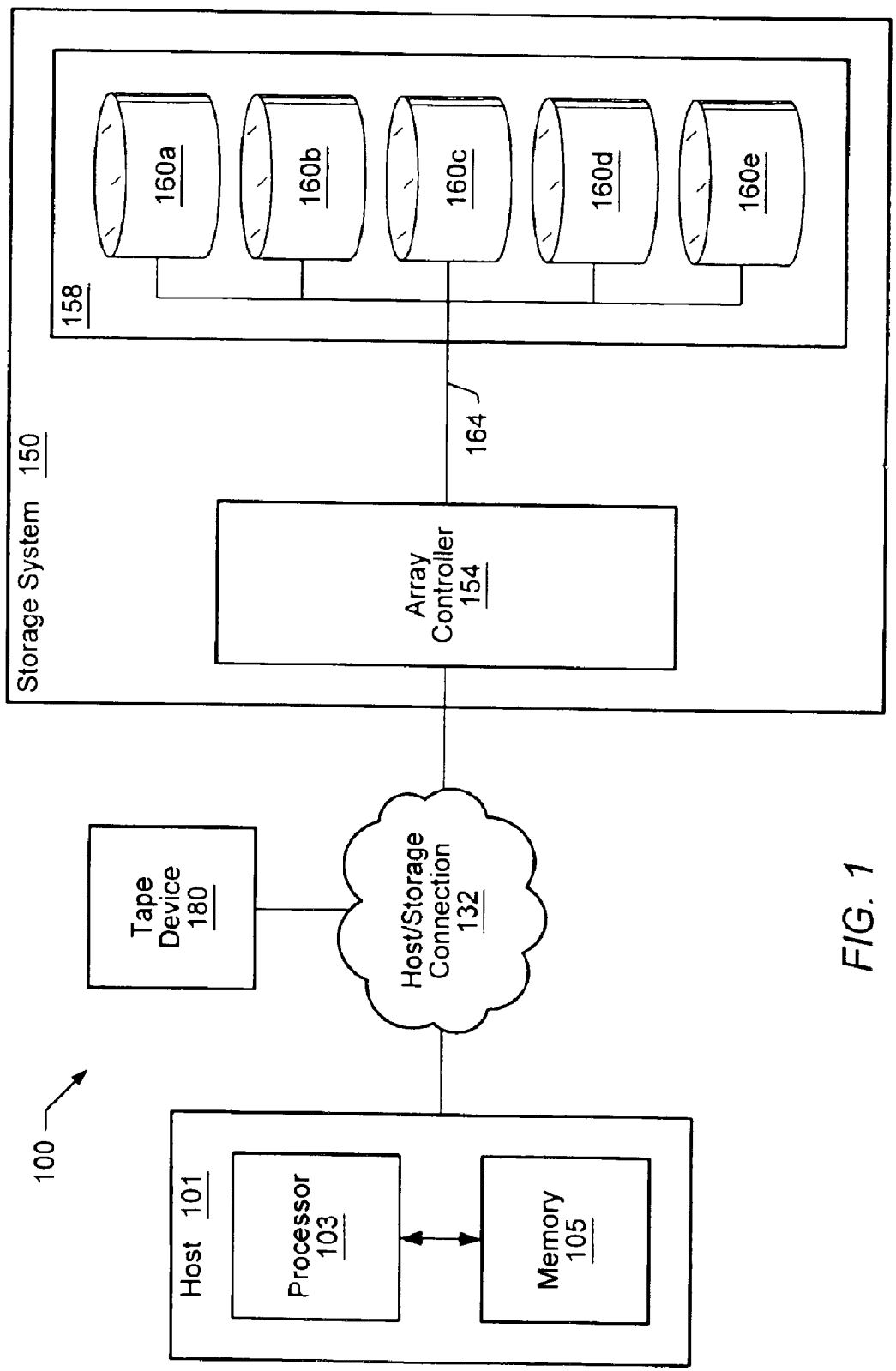
FIG. 1 illustrates a block diagram of one embodiment of a data processing system that includes a tape device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A tape device driver may support operation-specific and/or device-specific timeouts. Operation-specific and/or device-specific timeouts may allow for increased timeout resolution for specific devices and/or operations, and thus allow for more accurate driver response in some cases. Note that in other embodiments, operation-specific and/or device-specific timeouts may be used with other storage devices. For example, operation-specific timeouts may be specified for storage devices having mechanical components that can cause delays in responding to commands. These devices can include tape drives and tape drive arrays, hard disk drives and arrays, CD-ROM drives and arrays (e.g., jukeboxes), DVD-ROMs and arrays, etc.

FIG. 1 shows one embodiment of a data processing system that includes one or more tape devices 180. Data processing system 100 includes a host 101 connected to a storage system 150 via host/storage connection 132. Host/storage connection 132 may be, for example, a local bus, a network connection, an interconnect fabric, or a communication channel. Storage system 150 may be a RAID storage subsystem or other type of storage array. In some embodiments, multiple hosts 101 may be in communication with several storage systems 150 via host/storage connection 132.

Included in storage system 150 is a storage device array 158 that includes a several storage devices 160a–160e (collectively referred to as storage devices 160). Storage devices 160a–160e may be, for example, magnetic hard disk drives, optical drives, magneto-optical drives, tape devices, solid state storage, or other non-volatile memory. As shown in FIG. 1, storage devices 160 are disk drives and storage device array 158 is a disk drive array. Although FIG. 1 shows a storage device array 158 having five storage devices 160a–160e, it is understood that the number of storage devices 160 in storage device array 158 may vary and is not limiting.

Storage system 150 also includes an array controller 154 connected to each storage device 160 in storage array 158 via one or more data paths 164. Data path 164 may provide communication between array controller 154 and storage devices 160 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 154 may take many forms, depending on the design of storage system 150. In some systems, array controller 154 may only provide simple I/O connectivity between host 101 and storage devices 160 and the array management may be performed by host 101. In other embodiments of storage system 150, such as controller-based RAID systems, array controller 154 may also include a volume manger to provide volume management, data redundancy, and file management services. In other embodiments of the present invention, the volume manager may reside elsewhere in data processing system 100. For example, in software RAID systems, the volume manager may reside on host 101 and be implemented in software. In other embodiments, the volume manager may be implemented in firmware that resides in a dedicated controller card on host 101. In some embodiments, array controller 154 may be connected to one or more of the storage devices 160. In yet other embodiments, a plurality of array controllers 154 may be provided in storage system 150 to provide for redundancy and/or performance improvements. In some embodiments, system 100 may include one or more individual storage devices (e.g. disk drives) connected to connection 132 instead of or in addition to storage system 150. In one embodiment, storage system may be a JBOD (Just a Bunch Of Disks) instead of an array system.

One or more tape devices 180 (e.g., a single tape drive, a multiple drive device, an automated tape library, a jukebox-type tape device, etc.) are also included in data processing system 100. In one embodiment, data stored in storage system 150 may be backed up to tape device 180. Each tape device may include one or more tape drives configured to read and write data to one or more tapes. Thus, tape device 180 provides a means for accessing one or more tapes. Each tape drive may be configured so that a user can insert and eject a tape (e.g., a reel, cassette, or cartridge that includes a tape storage medium) into the tape drive. In some embodiments, a tape device may include one or more automated mechanisms that load and unload tapes into a tape drive included in the tape device. Note that in some embodiments, all or some of storage devices 160 may also be tape devices.

Figure 2:
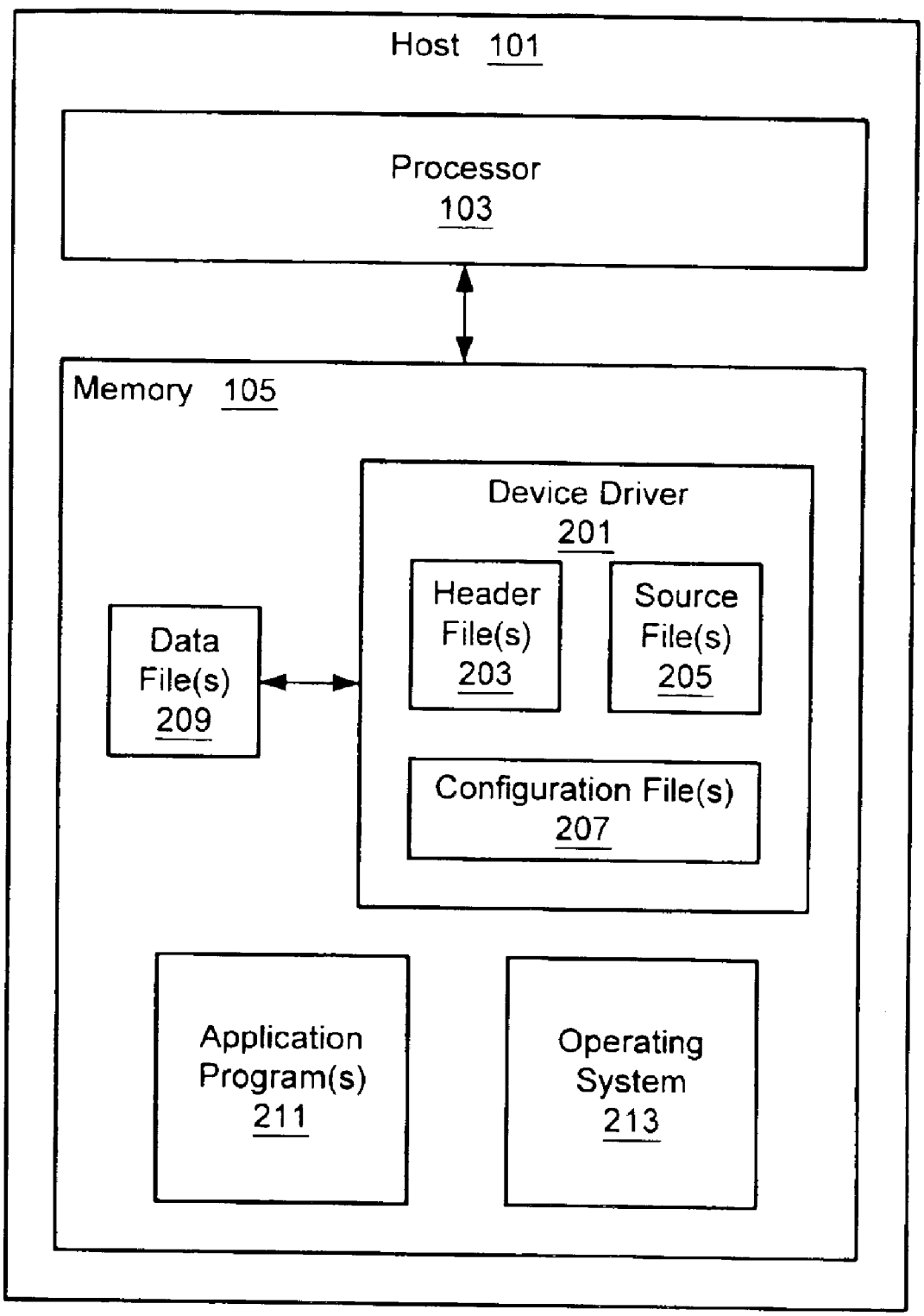
FIG. 2 shows a block diagram of one embodiment of a host computer system that may provide commands to a tape device.

FIG. 2 shows one embodiment of host 101. Blocks 201–213 represent various instruction and/or data files (or groups of several of such files) that may be stored in memory 105. Memory 105 may include random access memory (RAM) such as DRAM, SDRAM, DDR DRAM, RDRAM, etc. As shown, memory 105 may store instructions implementing an operating system 213 and one or more application programs 211. These instructions may be executed by processor 103. Application programs 211 running on a host computer system 101 may initiate commands to a tape device 180. These commands may be generic to an operating system 213 running on the host computer system. A tape driver 201 running on the host computer system 101 may translate the generic commands into device-specific commands to which the tape device will respond and provide these device-specific commands to the tape device 180. The instructions that implement the tape driver 201 may be stored in memory 105 and executed by processor 103. Similar device drivers may be implemented for other types of storage devices.

The tape driver 201 may initiate a timeout period each time it provides a command to the tape device. Timeout values indicating the duration of timeout periods that may be initiated may be stored in a configuration file 207 or a data file 209 that is accessible by the tape driver 201. The timeout values may each be associated with different types of tape devices and/or different types of tape device commands, as will be described in more detail below. Accordingly, a tape driver (or a host computer system running a tape driver) may provide a means by which commands may be provided to a tape drive included in tape device 180 from application programs running on host computer system 101. A tape driver (or a host computer system on which a tape driver is running) may also provide a means for initiating a timeout period for each command provided to tape device 180. Embodiments of device drivers implemented for other types of storage devices may also specify device-specific and/or operation-specific timeouts in a similar manner. For example, these device drivers may read a timeout value associated with a particular brand and/or model of a storage device being accessed and initiate a timeout period having a duration specified by that timeout value.

In some embodiments, the tape driver software 201 may be stored on another computer readable medium (e.g., a CD, DVD, hard disk, optical disk, tape device, floppy disk, etc.). In order to execute the instructions, the instructions may be loaded into system memory 105. In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data used to implement the tape driver may also be transferred upon a carrier medium. In some embodiments, a computer readable medium may include a carrier medium such as networks and/or a wireless link upon which signals such as electrical, electromagnetic, or digital signals may be conveyed.

Instructions implementing a tape driver 201 may be divided into several files such as header files 203 (e.g., .h files), source files 205 (e.g., .c files), and/or configuration files 207 (e.g., driver.conf files). In one embodiment, header files 203 may define data structures specific to a tape device (e.g., a structure representing the tape device's registers), data structures defined by the tape driver for maintaining state information related to the tape device, defined constants (e.g., constants representing bits of a tape device's registers), and/or macros. This information may be divided into public and private headers depending on whether the information may be accessed by the tape driver 201 only (in which case it is placed in a private header) or by both the device driver and applications other than the device driver (in which case it is placed in a public header). A header file 203 may be included in a tape driver 201 using an #include statement. A configuration file 207 (e.g., .c file) for a tape driver 201 may contain the #include statements, declare external references, declare local data, set up various data structures, declare and initialize a module configuration section, make other declarations, and/or define the tape driver's entry points.

A tape driver 201 may initiate a timeout period each time it provides a command to a tape device 180. For example, a timeout period may be initiated by setting a counter in a HBA (Host Bus Adapter) (e.g., included in host computer system 101 to couple the host 101 to the host/storage connection 132) to a default value and causing the counter to be decremented until either the count reaches zero or the tape device 180 responds to the command. If the timeout period expires (e.g., the count reaches zero) before the tape device 180 responds to the command, the tape driver 201 may return an error indication to the OS 213 or application program 211 that initiated the command. If the tape device 180 responds to the command within the timeout period, the tape driver 201 may return the response to the OS 213 or application program 211 and stop keeping track of the timeout period (e.g., by stopping and/or resetting the counter in the HBA). In various embodiments, an HBA may include devices such as an array controller (e.g., array controller 154) or a SCSI adapter (e.g., an adapter that connects several SCSI devices to another bus such as a PCI (Peripheral Component Interconnect) bus).

Different time out values may specified for multiple categories of tape device commands. In some embodiments, tape driver 201 (or a data file 209 accessible by the tape driver 201) may specify timeout values for three or more categories of commands. Commands may be grouped into categories based on the average or median time the tape device operations the commands initiate take to complete. For example, in one embodiment, commands may be divided into three categories. The first category may include commands that tend to complete rather quickly. The timeout value for the first category may have a value less than or equal to 10 minutes, for example. The second category may include commands that tend to take longer to complete and may have a timeout value on the order of 30 minutes to an hour, for example. The third category may include commands that tend to take the longest to perform and may have a timeout value on the order of several hours, for example. This granularity in assigning timeout values may allow for a more efficient driver reaction when a tape device in unresponsive. Accordingly, less time may be spent needlessly waiting for a command to timeout and performance may be improved relative less granular solutions.

Note that different timeout values and categories may be used in other embodiments. For example, in another embodiment, a first category may be defined to include inquiry commands (described below) and have a timeout value of a minute or less, for example. A second category may include I/O commands and have a timeout value of two minutes or less, for example. A third category may include several other types of commands and have a timeout value of several hours, for example.

Other categorizations and number of categories for time out values may be provided for in other embodiments. For example, in one embodiment, timeouts may be defined for the following seven categories of commands: inquiry commands, I/O commands, rewind commands, space commands, load commands, unload commands, and/or erase commands, as shown in the table 300 in FIG. 3. Inquiry commands are commands that do not cause a tape drive to move a tape medium. One example of an inquiry command is a request for a tape device's ID. Since these commands do not involve movement of the tape, they tend to complete relatively quickly (e.g., within a few seconds or less).

I/O commands are commands that access the tape medium (e.g., read and write commands). These commands typically specify the location of the tape medium that is already under or near the current read/write head position. In some embodiments, I/O commands may be executed relatively quickly and have timeout values on the order of a few minutes or less.

A rewind command requests that a tape be rewound. Rewinding typically causes the tape to rewind to the beginning of the tape. Thus, these commands typically take a relatively long time to complete, especially for longer tapes and slower tape transport mechanisms. Timeouts for rewind commands may have values of one or more hours. Space commands may cause a tape drive to advance a tape to a certain position (e.g., the inter-record gap before a specified record). Like rewind commands, these commands may take a relatively long time to complete.

Load commands request that a particular tape be loaded into a tape drive and may, in some embodiments, have values of a few minutes. Unload commands request that a tape be removed from a tape drive. Like load commands, these commands may have timeout values of a few minutes. Erase commands cause data stored on all or part of a tape to be erased (e.g., by overwriting the written portions of the tape with a certain value for security purposes). These commands may have relatively lengthy timeouts (e.g., one or more hours). Note that other embodiments may define timeouts for different numbers of and/or types of categories and use different timeout values for each defined category.

Each category of commands may be assigned a default timeout value, as shown in FIG. 3. The default values may be selected so that they are applicable to most tape device vendors' models. Whenever a particular command is provided to tape device 180, the device driver 201 may use the default timeout value specified for that command's category of commands to determine when the command should be timed out. Each timeout value may be specified in a particular unit of time (e.g., seconds).

Multipliers may be provided to adjust the default timeout values. In one embodiment, a single multiplier that is applied to the default timeout values in each category of commands may be available. In order to apply the multiplier to the default timeout values, an attribute indicating that a particular device needs longer timeouts may be selected. In one embodiment, this attribute may simply indicate that a default multiplier (e.g., 5) should be applied to one or more of the default timeout values. In another embodiment, this attribute may also allow a user to specify the multiplier that should be applied. This attribute may be selected by modifying a configuration value or flag in a configuration file 207 or data file 209. Some embodiments may have different attributes for each category of commands so that multipliers may be applied to independently to the timeouts for each category of commands.

Several multiplier values may be available in some embodiments. This way, different multiplier values may be specified for different categories of commands. In some embodiments, all or some of the categories may have category-specific default multiplier values, as shown in FIG. 3. In one embodiment, a user may specify one or more specific multiplier value(s) (e.g., by modifying a configuration value) to be used with the different categories. In some embodiments one or more global multipliers may be provided in addition to or instead of the per-category multipliers. A global multiplier may affect all of the timeout values. In some embodiments, a multiplier may be a fractional multiplier for reducing a timeout value.

Figure 4:
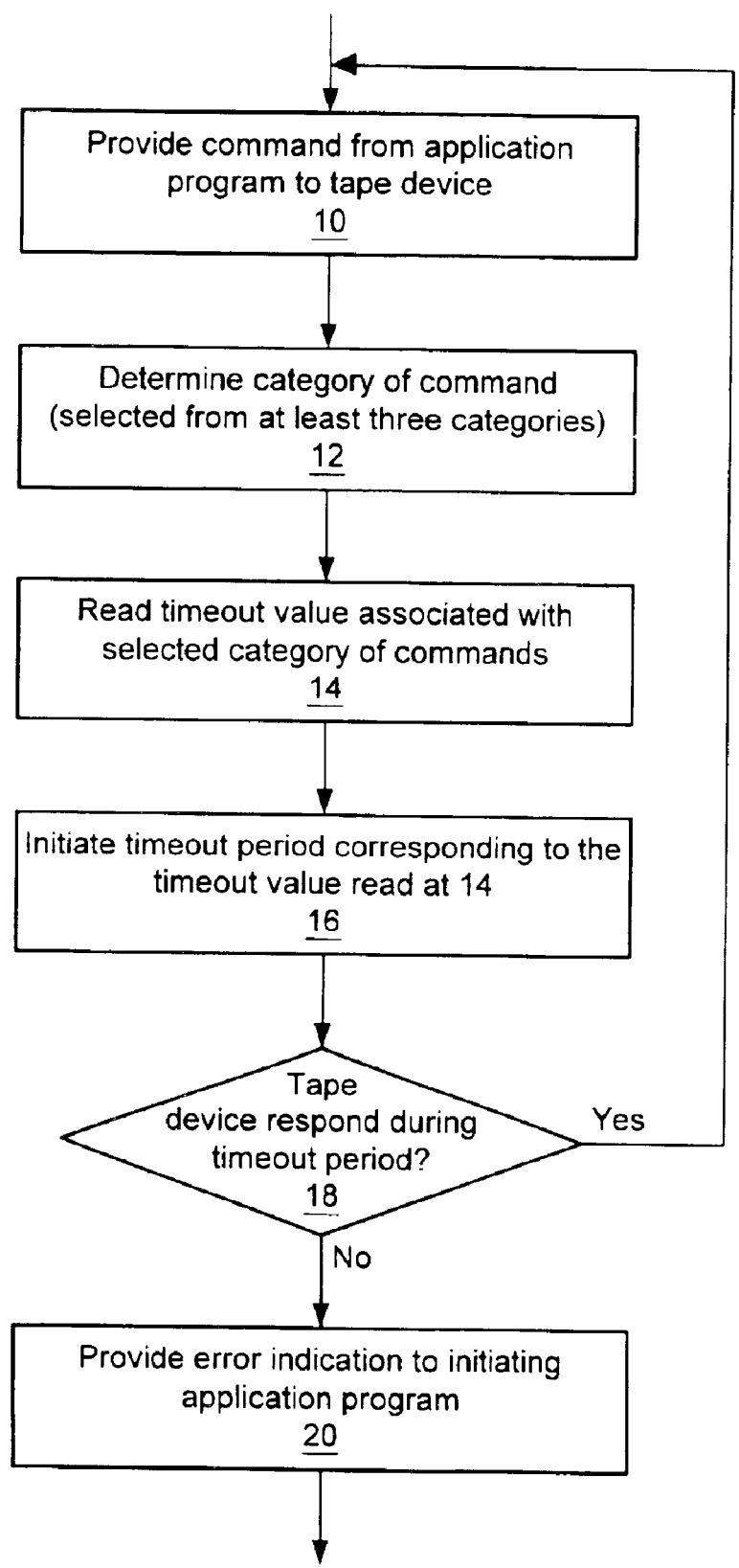
FIG. 4 is a flowchart of one embodiment of a method of operating a tape device for which operation-specific timeouts are defined.

FIG. 4 shows one embodiment of a method of operating a tape device for which three or more command-specific or command category specific timeout values are defined. At 10, a command is provided from an application program to a tape device. Providing the command may involve a tape driver translating the command (which may be generic to an operating system) to one or more commands to which the tape device will respond. The tape driver may then determine which category of commands the command being provided to the device belongs in, as indicated at 12, and read the timeout value associated with that category, as shown at 14. For example, if the command provided to the tape device is included in a first category of commands, a first timeout value may be read from a file (e.g., a configuration or data file). Similarly, if the command is included in a second or third category of commands, a second or third timeout value may be read.

In some embodiments, reading the timeout value to use for a particular type of command may also involve reading an attribute value associated with that type of command to determine whether a multiplier should be applied to the timeout value read. The multiplier may be a default multiplier (e.g., associated with one or more categories of commands) or a user-supplied value.

At 16, a timeout period corresponding to the timeout value read in 114 is initiated. For example, initiating the timeout period may involve setting a counter in an HBA to an initial value corresponding to the timeout value and decrementing the counter at regular intervals. The timeout period may be initiated at the same time as the command is provided to the tape device in some embodiments. In other embodiments, the timeout period may be initiated somewhat before or after the command is provided to the tape device (e.g., the order in which these steps are performed may be different than illustrated in FIG. 4).

If the tape device responds to the command provided at 10 during the timeout period initiated at 16, the tape device's response may be returned to the application program that initiated the command and operation may continue normally, as shown at 18. The timeout period initiated at 16 may also be halted (e.g., by ceasing to monitor a counter in the HBA or by resetting or stopping the counter). If the tape device does not respond within the timeout period, an error indication may be returned to the initiating application program, as shown at 18–20. Depending on the type of error, the command may be retried or an error indication may be provided to a user or operator of the computer system that includes the non-responding tape device.

In some embodiments, device-specific timeouts may be defined. These device-specific timeouts may be used instead of a default timeout value when the type of tape device 180 being operated has an associated set of timeouts. In some embodiments, a device driver 201 may be configured to select the appropriate timeout values from a configuration table 350 like the one shown in FIG. 5. The configuration table 350 may include timeout values for one or more different types of tape devices. The device driver 201 may determine which timeout values to select based on information identifying a particular tape drive. For example, the command may specify a particular I/O address that maps to that particular tape drive. The device driver may use the I/O address to look up which type of tape drive is being accessed. Once the type of device is determined, the device driver may access that device's timeout values.

In one embodiment, a tape driver 201 may include a built-in configuration table 350 listing various supported types of tape drives (e.g., indexed by VID (Vendor ID) and/or part number as shown). In some embodiments, tape device manufacturers may supply a configuration table 350 (or the information to be stored in the configuration table) for their tape devices. In some embodiments, each type of device's timeouts may be stored in a type-specific configuration file.

Each set of device-specific timeouts may include operation-specific timeouts such as described above. For example, in one embodiment, seven different timeouts to be used for seven categories of operations or commands (as shown in FIG. 3) may be defined for a particular tape device 180. Note that different types of devices may have different numbers of command categories for which different timeouts are defined. For example, a first type of a tape device may have two categories of commands for which timeouts are defined and a second type of device may have five categories of commands for which timeouts are defined.

Figure 6:
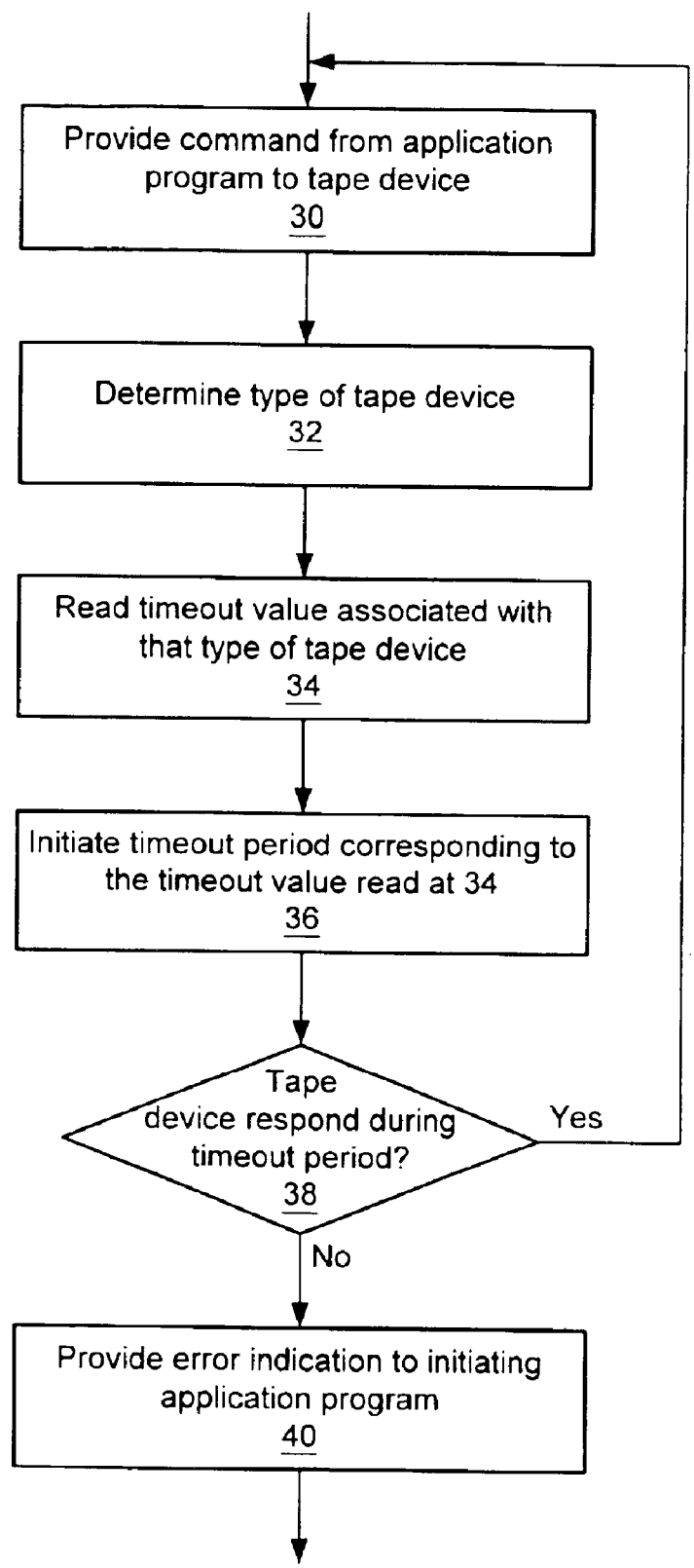
FIG. 6 is a flowchart of one embodiment of a method of operating a tape device for which device-specific timeouts are defined.

FIG. 6 shows one embodiment of a method of operating a tape device for which device-specific timeout periods are defined. At 30, a command is provided from an application program to a tape device. At 32, the type of tape device is determined (e.g., by using the I/O address of the command as an index into a device-type lookup table). A timeout value associated with that type of tape device is read at 16. For example, if the tape device is a first type of tape device, a device-specific timeout value defined for the first type of tape device may be read from a file. If instead the tape device is a second type of device, a second timeout value may be read. If no device-specific timeout value is specified for the tape device targeted by the command, the timeout value may be a default timeout value.

Reading a device-specific timeout at 34 may also involve reading a command-specific timeout defined for a particular device (e.g., as shown in FIG. 4) in some embodiments.

A timeout period corresponding to the timeout value read at 34 may be initiated at 36. If the tape device responds during the timeout period, its response may be returned to the requesting application program and operation may proceed normally. If the tape device does not respond before the end of the timeout period, an error indication may be returned to the initiating application program, as shown at 38–40.

In many embodiments, a tape driver 201 may be configured so that a user can modify existing timeout values. For example, an interface may be provided so that a user may add, delete or edit time-out values or entries. An interface may also allow timeout categories to be changed, multipliers to be edited, etc. Additional commands may be defined so that a user can read out the current timeout values (e.g., from a data file 209 or a configuration file 207) and input new timeout values to the device driver 201. This may allow a user to tune one or more of the timeout values to improve the performance of a particular tape device. For example, if a user experiences problems with a timeout setting, the user may read out the current timeout value and increase or decrease the setting until a desired level of performance is obtained. In some embodiments, as user may edit the timeout value information by editing a timeout configuration file, for example, using a text editor on the computer system.

Figure 7:
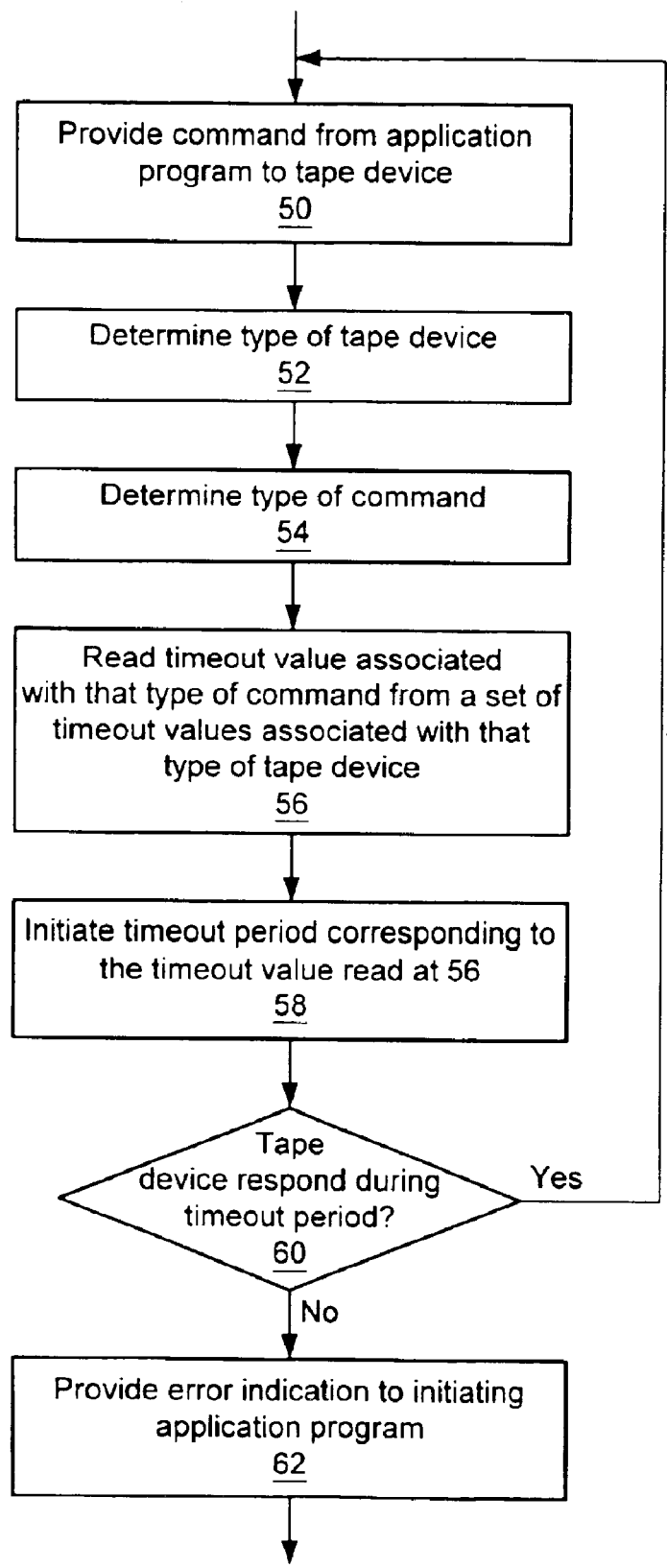
FIG. 7 shows a flowchart of another embodiment of a method of initiating timeout periods.

FIG. 7 shows a flowchart of another embodiment of a method of initiating timeout periods. In this embodiment, timeouts are both device-specific and command-specific. At 50, a command is provided from an application program to a tape device. At 52, the type of tape device is determined. At 54, the type of command is determined. A timeout value associated with that type of command is read from a set of timeout values associated with that type of tape device, as indicated at 56. A timeout period corresponding to the timeout value read at 56 may be initiated at 58. If the tape device responds during the timeout period, its response may be returned to the requesting application program and operation may proceed normally. If the tape device does not respond before the end of the timeout period, an error indication may be returned to the initiating application program, as shown at 60–62.

In one embodiment, an ioctl (e.g., ioctl(9E) as defined for the Solaris operating system) driver entry point may provide a mechanism for application programs 211 to change and/or determine the status of a tape driver 201's configurable characteristics. For example, a user may read and/or modify timeout values for a particular type of tape driver 201 using an ioctl.

The characteristics of a tape device and/or a tape driver 201 may be defined using properties, and these properties may be modified using an ioctl or similar modification mechanism. A property may be expressed as a name-value pair and stored as an entry in a configuration file. The name is a string that identifies the property with an associated value included in the value portion of the property. Examples of properties include the default block size of a tape device and the name of a device. Additional types of tape drives (e.g., not already included in a configuration table 350 included in a device driver 201) may be given device-specific timeouts by supplying device information as a property.

In one embodiment, a property may include the following structure: <name>=<triplet>[, <triplet>*], where <triplet>:= <VID+PID>, <pretty print>, <data property name>. The VID is the vendor ID and the PID is the part ID of a particular device. Pretty print is text that may be displayed to a user when the user accesses the property. In one such embodiment, the <data property name> may be used to specify various properties of a tape device: <version>, <type>, <block size>, <options>, <number of densities>, <density>[, <density>*], <default density>, <inquiry timeout>, <io timeout>, <rewind timeout>, <space timeout>, <load timeout>, <unload timeout>, <erase timeout>. Version specifies the version of the data property. For example, an earlier version may only support two timeout values, while subsequent versions may support more timeout values. A user may enter a property by entering "data property name=" followed by a list of values for each of the structures in the property. This exemplary property includes timeout fields for seven timeout values. The seven timeout categories (inquiry, io, rewind, space, load, unload, erase) defined in the exemplary property above correspond to the categories described with respect to FIG. 3. A user may create an entry for a tape device using the property for an exemplary tape device of type EXB-850X by entering: EXB-850X=2, 0×29, 0, 0×8e39, 4, 0×14, 0×15, 0×8c, 1, 0, 0, 0, 7200, 0, 0, 0. Timeouts may be specified in seconds, and thus this entry may set the timeout value for space timeouts to 7200 seconds (2 hours). The other timeout values are set to zero, which may indicate that default timeout values (as opposed to category specific and/or device specific timeout values) should be used when commands of those types are provided to tape devices of type EXB-850X.

In some embodiments, a tape device manufacturer may publish timeout values for tape devices it manufactures. A user may input these timeout values to the tape driver (e.g., by editing a tape driver file or by using an ioctl command).

In some embodiments, a device driver may be upgraded to include timeout structures that each store a device-specific and/or command-specific timeout value. In order for the upgraded device driver to be operable in the same environment as non-upgraded device drivers, the new timeout structures may be appended to the end of a preexisting structure list. The preexisting structure list may include default timeout values for one or two previously supported categories of tape drive commands. For example, in the exemplary property above, the timeout structures appear at the end of the list of structure list. If a new timeout structure has a non-zero value, as the space timeout structure does above, the new timeout structure may be used instead of a preexisting timeout structure. If a new timeout value has a value of zero (e.g., because new timeout values are not specified by a non-upgraded tape driver), a preexisting value or values may be used instead of the new timeout values. Thus, if a tape driver does not specify the new timeout values, their zero value indicates that the preexisting timeout structures should be used. Accordingly, the new timeout structures may be used by newer drivers and the preexisting structures may be used by older drivers. Additionally, newer drivers may continue to use the preexisting timeout structures (e.g., until a user updates a tape driver property to indicate values for the new timeout structures). Thus, in the above example, since the timeout values for all of the command categories except space commands are set to zero, the default timeout values (e.g., in two categories of commands) may be used instead of category-specific values for each of the categories except space commands.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a tape device comprising one or more tape drives; and
   a host computer system coupled to the tape device, wherein the host computer system is configured to provide commands to the tape device and to initiate a timeout period for each command provided to the tape device;
   wherein the host computer system is configured to initiate a first timeout period if a first type of command is provided to the tape device, to initiate a second timeout period if a second type of command is provided to the tape device, and to initiate a third timeout period if a third type of command is provided to the tape device, wherein the first timeout period, the second timeout period, and the third timeout period each have a different duration; wherein each timeout period of the first, second and third timeout periods is derived from a the corresponding timeout value and a multiplier if an attribute value matches a particular setting; and
   wherein the first command type, the second command type and the third command type each have a different multiplier value.

2. The computer system of claim 1, wherein the first type of command is a rewind command, wherein the second type of command is an I/O command, and wherein the third type of command is an erase command.

3. The computer system of claim 1, wherein the timeout period is a fourth timeout period if the command is a load command.

4. The computer system of claim 1, wherein the timeout period is a fourth timeout period if the command is an unload command.

5. The computer system of claim 1, wherein the timeout period is a fourth timeout period if the command is an inquiry command.

6. The computer system of claim 1, wherein the timeout period is a fourth timeout period if the command is a space command.

7. The computer system of claim 1, wherein the timeout period is a fourth timeout period if the command is a first type of command and the tape device is a first type of tape device.

8. The computer system of claim 1, wherein the host computer system is configured to display a first timeout value corresponding to a duration of the first timeout period, a second timeout value corresponding to a duration of the second timeout period, and a third timeout value corresponding to a duration of the third timeout period to a user.

9. The computer system of claim 2, wherein the host computer system is configured to receive a input indicating a new first timeout value from a user and to store the new first timeout value in a memory.

10. A tangible computer readable mediums comprising program instructions computer executable to:
    provide a command initiated by an application program to a tape device;
    read a timeout value associated with a category of commands that includes the command, wherein the category of commands is one of at least three categories of commands, wherein a different timeout value is associated with each of the at least three categories of commands;
    read an attribute value, wherein the attribute value indicates whether a multiplier applies to the timeout value, wherein each of the at least three categories of commands has a different attribute value;
    initiate a timeout period in response to providing the command to the tape device, wherein the timeout period equals the timeout value if the attribute value matches a first setting, and wherein the timeout period is derived from the timeout value and the multiplier if the attribute value matches a second setting; and
    return an error indication to the application program if the tape device has not responded to the command by the end of the timeout period.

11. The tangible computer readable medium of claim 10, wherein the at least three categories of commands include a rewind command category, an I/O command category, and an erase command category.

12. The tangible computer readable medium of claim 11, wherein the at least three categories of commands include a load command category.

13. The tangible computer readable medium of claim 11, wherein the at least three categories of commands include an unload command category.

14. The tangible computer readable medium of claim 11, wherein the at least three categories of commands include an inquiry command category.

15. The tangible computer readable medium of claim 11, wherein the at least three categories of commands include a space command category.

16. The tangible computer readable medium of claim 10, wherein the program instructions are further computer executable to determine a type of the tape device and to read the timeout value associated with a category of commands that includes the command from a set of timeout values associated with the type of the tape device, wherein the type of tape device is one of at least two types of tape devices.

17. The tangible computer readable medium of claim 10, wherein the program instructions are further computer executable to output the different timeout values for each of the at least three categories of commands to a user.

18. The tangible computer readable medium of claim 10, wherein the program instructions are further computer executable to receive a new timeout value for one of the at least three categories of commands from a user and to store the new timeout value.

19. The tangible computer readable medium of claim 10, wherein the program instructions are further computer executable to read a multiplier value, wherein each of the at least three categories of commands has a different multiplier value.

20. A tangible computer readable medium, comprising program instructions computer executable to:
    provide a command initiated by an application program to a tape device;
    read a timeout value associated with a category of commands that includes the command, wherein the category of commands is one of at least three categories of commands, wherein a different timeout value is associated with each of the at least three categories of commands;
    initiate a timeout period corresponding to the timeout value in response to providing the command to the tape device, wherein if the timeout value equals zero, the program instructions are computer executable to read a non-zero default timeout value and to initiate the timeout period corresponding to the non-zero default timeout value; and return an error indication to the application program if the tape device has not responded to the command by the end of the timeout period.

21. A tangible computer readable medium, comprising program instructions computer executable to:
provide a command to a tape device;
read data indicative of a timeout duration by reading a first data value if the tape device is a first type of tape device and reading a second data value if the tape device is a second type of tape device;
detect whether a timeout multiplier applies to the timeout duration by reading an attribute value;
initiate a timeout period derived from the data, the attribute value and the multiplier; and
generate an error indication if the tape device has not responded to the command by the end of the timeout period;
wherein if the timeout multiplier applies, the program instructions are computer executable to read the timeout multiplier and to initiate the timeout period corresponding to a product of the timeout duration and the timeout multiplier; wherein if the tape device is the first type of tape device, the program instructions are computer executable to read a first timeout multiplier, wherein if the tape device is the second type of tape device, the program instructions are computer executable to read a second timeout multiplier.

22. The tangible computer readable medium of claim 21, wherein if the tape device is the first type of tape device, the program instructions are computer executable to read the first data value if the command is a first type of command, a third data value if the command is a second type of command, and a fourth data value if the command is a third type of command.

23. A method of operating a tape device, the method comprising:
providing a command initiated by an application program to the tape device;
reading a timeout value associated with a category of commands that includes the command, wherein the category of commands is one of at least three categories of commands, wherein a different timeout value is associated with each of the at least three categories of commands;
reading an attribute value indicating whether a multiplier applies to the timeout value;
reading a multiplier value, wherein each of the at least three categories of commands has a different multiplier value;
initiating a timeout period in response to providing the command to the tape device, wherein the timeout period equals the timeout value if the attribute value matches a first setting, and wherein the timeout period is derived from the timeout value and the multiplier if the attribute value matches a second setting; and
returning an error indication to the application program if the tape device has not responded to the command by the end of the timeout period.

24. The method of claim 23, wherein the at least three categories of commands include a rewind command category, an I/O command category, and an erase command category.

25. The method of claim 24, wherein the at least three categories of commands include a load command category.

26. The method of claim 24, wherein the at least three categories of commands include an unload command category.

27. The method of claim 24, wherein the at least three categories of commands include an inquiry command category.

28. The method of claim 24, wherein the at least three categories of commands include a space command category.

29. The method of claim 23, further comprising determining a type of the tape device and reading the timeout value associated with a category of commands that includes the command from a set of timeout values associated with the type of the taps device, wherein the type of tape device is one of at least two types of tape devices.

30. The method of claim 23, further comprising outputting the different timeout values for each of the at least three categories of commands to a user.

31. The method of claim 23, further comprising receiving a new timeout value for one of the at least three categories of commands from a user and storing the new timeout value.

32. The method medium of claim 23, wherein each of the at least three categories of commands has a different attribute value.

33. A method of operating a tape device the method comprising:
providing a command initiated by an application program to the tape device;
reading a timeout value, associated with a category of commands that includes the command, from a file including a plurality of timeout values that each correspond to a respective category of at least three categories of commands, wherein a different timeout value is associated with each of the at least three categories of commands;
reading a non-zero default timeout value if the timeout value read from the file equals zero;
initiating a timeout period corresponding to the timeout value in response to providing the command to the tape device, wherein the timeout period is initiated to the non-zero default timeout value if the timeout value read from the file equals zero; and
returning an error indication to the application program if the tape device has not responded to the command by the end of the timeout period.

34. A method of operating a tape device, the method comprising:
providing a command to the tape device;
determining a type of the tape device, wherein the type is one of at least two types of tape devices;
reading a timeout value associated with the type of tape device and type of command, wherein a different timeout value is associated with each of the at least two types of tape devices and command types;
reading an attribute value indicating whether a multiplier applies to the timeout value;
wherein if the tape device is the first type of tape device, reading a first timeout multiplier, wherein if the tape device is the second type of tape device, reading a second timeout multiplier;
initiating a timeout period derived from the timeout value, the attribute value and the multiplier; and
generating an error indication if the tape device has not responded to the command by the end of the timeout period.

35. A method of operating a tape device, the method comprising:
providing a command initiated by an application program to the tape device;

reading a timeout value according to a type of the command, wherein the timeout value is a first timeout value if the command is an inquiry command, a second timeout value if the command is an I/O command, and a third timeout value if the command is another type of command, wherein the first, second, and third timeout values are not equal;

reading an attribute value indicating whether a multiplier applies to the timeout value;

wherein each of the three types of commands has a different attribute value;

deriving a timeout period from the timeout value, the attribute value and the multiplier;

initiating the timeout period in response to providing the command to the tape device; and returning an error indication to the application program if the tape device has not responded to the command by the end of the timeout period.

36. A computer system comprising:

means for accessing one or more tapes; and means for providing commands to the means for accessing, wherein the means for providing commands are configured to initiate a timeout period for each command provided to the means for accessing;

wherein the means for providing commands are configured to initiate a first timeout period if a first type of command is provided to the means for accessing, to initiate a second timeout period if a second type of command is provided to the means for accessing, and to initiate a third timeout period if a third type of command is provided to the means for accessing, wherein each timeout period of the first, second and third timeout periods is derived from a corresponding timeout value and a multiplier if an attribute value matches a particular setting;

wherein each of the first command type, the second command type, and the third command type each have a different multiplier value.

37. A computer system, comprising:

a storage device; and a host computer system coupled to the storage device, wherein the host computer system is configured to provide commands to the storage device and to initiate a timeout period for each command provided to the storage device;

wherein the host computer system is configured to initiate a first timeout period if a first type of command is provided to the storage device, to initiate a second timeout period if a second type of command is provided to the storage device, and to initiate a third timeout period if a third type of command is provided to the storage device, wherein each timeout period of the first, second and third timeout periods is derived from a corresponding timeout value and a multiplier if an attribute value matches a particular setting;

wherein the first command type, the second command type, and the third command type each have a different multiplier value.

38. The computer system of claim 37, wherein the storage device includes at least one hard disk drive.

39. A tangible computer readable medium, comprising program instructions computer executable to:

provide a command to a storage device;

read data indicative of a timeout duration by reading a first data value if the storage device is a first type of storage device and reading a second data value if the storage device is a second type of storage device, wherein the first type and the second type are differentiated by at least one of: a brand of the storage device and a model of the storage device;

read an attribute value indicating whether a multiplier applies to the timeout value;

initiate a timeout period, wherein the timeout period equals the timeout duration if the attribute value matches a first setting, and wherein the timeout period is derived from the timeout duration and the multiplier if the attribute value matches a second setting;

generate an error indication if the storage device has not responded to the command by the end of the timeout periods;

wherein if the timeout multiplier applies, the program instructions are computer executable to read the timeout multiplier and to initiate the timeout period corresponding to a product of the timeout duration and the timeout multiplier;

wherein if the storage device is the first type of storage device, the program instructions are computer executable to read a first timeout multiplier, wherein if the storage device is the second type of storage device, the program instructions are computer executable to read a second timeout multiplier.

* * * * *

UNITED STATES PATENT AND TRADEMARK OFFICE
CERTIFICATE OF CORRECTION

PATENT NO.    : 6,952,753 B2
DATED         : October 4, 2005
INVENTOR(S)   : Ralphs It is certified that error appears in the above-identified patent and that said Letters Patent is hereby corrected as shown below:

Column 14,
Line 10, between "the" and "device", delete "taps" and insert -- tape --.

Signed and Sealed this

Tenth Day of January, 2006

JON W. DUDAS
*Director of the United States Patent and Trademark Office*